United States Patent [19]
Wilson

[11] 3,970,398
[45] July 20, 1976

[54] SHAFT COUPLING

[75] Inventor: Gregory S. Wilson, Fort Worth, Tex.

[73] Assignee: United Technologies Corporation, Hartford, Conn.

[22] Filed: Aug. 4, 1975

[21] Appl. No.: 601,814

[52] U.S. Cl. ................................. 403/26; 403/359
[51] Int. Cl.² ....................... F16D 1/00; F16C 9/00
[58] Field of Search ................. 403/26, 359, 341; 308/27; 64/9 R, 1 R; 60/39.31

[56] References Cited
UNITED STATES PATENTS 2,738,125   3/1956   Ledwith ........................ 403/359 X
3,874,824   4/1975   Cronstedt ..................... 403/359 X

*Primary Examiner*—Andrew V. Kundrat
*Attorney, Agent, or Firm*—Norman Friedland

[57] ABSTRACT

This invention relates to a coupling for joining axially aligned shafts that are splined by utilizing an idle shaft supported to a bearing which shaft in turn supports each of the axially aligned shafts independently of each other whereby either of said mating shafts may be removed without the other falling out of place and the invention has particular application for the shaft of the compressor/turbine assembly in a turbine type of power plant.

4 Claims, 1 Drawing Figure

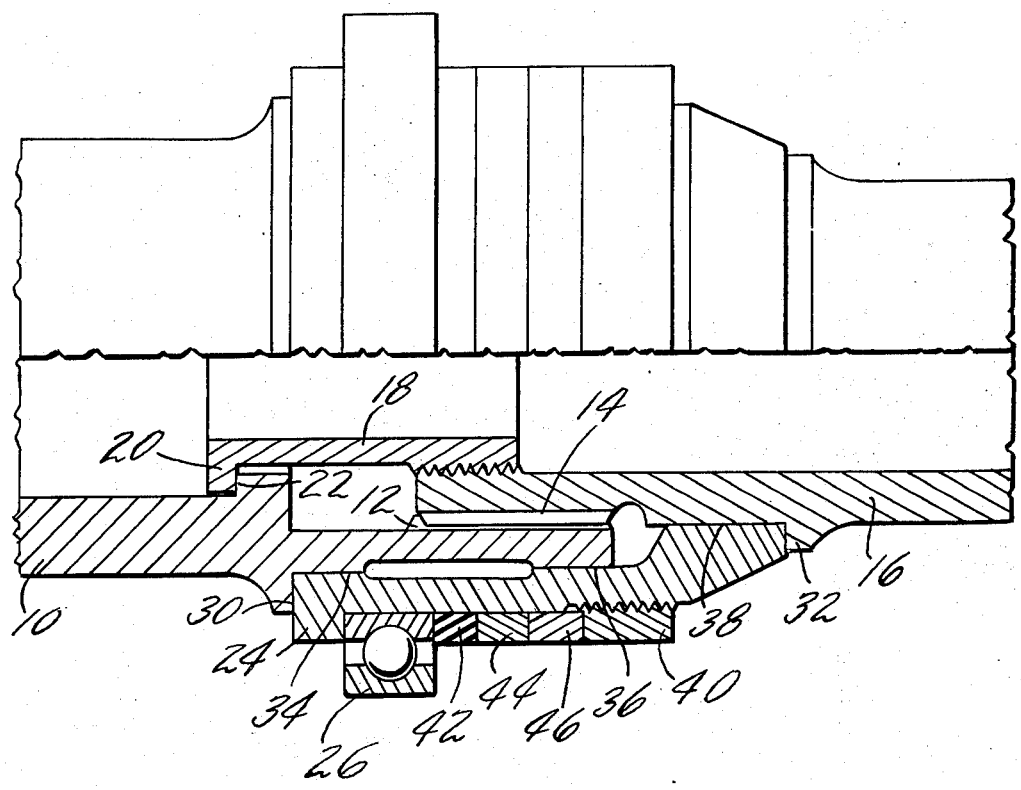

SHAFT COUPLING

BACKGROUND OF THE INVENTION

This invention relates to a torque coupling and particularly to a coupling for securing axially aligned shafts and supporting them independently of each other.

It is desirable in a turbine type of power plant to remove either the compressor section or the turbine section and leave in place the remaining section. Hence, as is well known in the art, the mating shafts of the turbine and compressor section are united by a spline and a coupling which keeps the shaft in place. Typically an internal nut engageable from either end of the engine is decoupled and one or the other sections can thereby be removed. Heretofore, the problem arose in reassembly by virtue of the fact that the remaining shaft could drop or move making it difficult to align the mating shafts.

I have found that I can obviate this problem by providing an idle shaft that includes stepped lands supporting each mating shaft independently allowing one to be removed while the other is supported in place. The idle shaft is frictionally supported to the mating shaft avoiding the necessity of incorporating a spline. Additionally the stepped lands can be machined at the same set up providing greater concentricity. Also it is an important feature of this invention, by virtue of the utilization of the idle shaft, the splines on the mating shafts do not serve to center each of these shafts.

SUMMARY OF THE INVENTION

An object of this invention is to provide a support and coupling means for axial aligned mating shafts which means are characterized as simple to manufacture and assemble and disassemble.

A further object of this invention is to provide for axial aligned mating shafts an idle shaft rotatably supported and frictionally secured to the mating shafts for supporting each of said mating shafts independently so as to allow removal of one without letting the other fall.

Other features and advantages will be apparent from the specification and claims and from the accompanying drawings which illustrate an embodiment of the invention.

BRIEF DESCRIPTION OF THE DRAWING

The sole FIGURE is a partial view, partly in section and partly in elevation illustrating the details of this invention.

DESCRIPTION OF THE PREFERRED EMBODIMENTS

Only that portion of a compressor and turbine section of a turbine power plant jet engine necessary to illustrate this invention is shown, but it should be appreciated that the invention can be utilized on a turbine power plant as for example, those manufactured by Pratt & Whitney Aircraft division of United Technologies Corporation some of which include the JT-4D, JT-8D and JT-9D to which reference is incorporated herein. Obviously as one skilled in the art will appreciate this invention has applications other than in the turbine power plant field.

As noted in the sole FIGURE shaft 10 carries at its end internal splines 12 which mates with splines 14 formed on the end of shaft 16, and in an axial type of compressor and turbine installation the turbine (not shown) would be mounted on shaft 16 on one end of the engine and the compressor (not shown) would be mounted on the other. Internal nut 18 suitably threaded to shaft 16 carries depending flange 20 that bears against shoulder 22 formed on shaft 10 locking the assembly into axial alignment.

In accordance with this invention idle shaft 24 disposed between mating shafts 10 and 16 is rotatably supported to ball bearing 26 and is frictionally secured therebetween by the shoulders 30 formed on shaft 10 and 32 formed on shaft 16. It is apparent from the foregoing that torquing nut 18 preloads the idle shaft 24 to the mating shafts 10 and 16 and with sufficient applied force the unit acts as an integral shaft.

Stepped lands 34, 36 and 38 formed internally of idle shaft 24 serve both to center and support shafts 10 and 16. Hence, if one shaft is removed by uncoupling nut 18 the other mating shaft will be retained by idle shaft 24. The lands serve to ease in the assembly by assisting in locating the splines and center the shafts. Since lands 34, 36 and 38 may be machined at the same set up in the manufacturing, greater concentricity can be attained.

Nut 40 threaded to the idle shaft 24 serves to preload the bearing 26 and the seal and spacer elements 42, 44 and 46 customarily used.

It should be noted that the idle shaft 24 is not driven by a spline or the like to enhance the simplicity of the design.

It should be understood that the invention is not limited to the particular embodiments shown and described herein, but that various changes and modifications may be made without departing from the spirit or scope of this novel concept as defined by the following claims.

I claim:

1. A shaft coupling for joining axially aligned hollow shafts which shafts have mating splines, an internal nut threadably secured to one of said shafts and having an end flange engaging a shoulder formed on the other of said shafts, a hollow idle shaft surrounding said aligned axial shafts and their mating splines, bearing means supporting said idle shaft, shoulder means on the outer diameter of each of said axially aligned shafts engaging the opposite ends of said idle shaft and at least a pair of lands formed on the inner diameter of said idle shaft engaging a portion of each of said axially aligned shafts whereby each axially aligned shaft is supported independently of each other.

2. A shaft coupling as claimed in claim 1 including a nut threadably secured to the outer diameter of said idle shaft urging said bearing means against a shoulder formed on the outer diameter of said idle shaft.

3. A shaft coupling as claimed in claim 1 wherein said bearing means is a ball bearing.

4. A shaft coupling for joining axially aligned hollow shafts which shafts have mating splines formed on the engaging end of said shafts, an internal nut threadably secured to one of said shafts and having at one end a depending portion engaging a shoulder formed on the other of said shafts, a hollow idle shaft surrounding said aligned axial shafts and their mating splines, bearing means supporting said idle shaft and shoulder means on the outer diameter of each of said axially aligned shafts engaging the opposite ends of said idle shaft, axially spaced stepped lands formed on the inner diameter of said idle shaft engaging a portion of each said axially aligned shafts each of said lands progressively decreasing in diameter, the end of one of said shafts having a support portion on its outer diameter engaging a first of said lands intermediate the ends of said idle shaft, a second land at the forward end of said idle shaft engaging an intermediate portion on said shaft engaging said first land to support and center said splines, and a third land engaging a portion of said other axially aligned shaft whereby each of said axially aligned shafts is supported independently of each other.

* * * * *